US005986420A

United States Patent [19]

Kato

[11] Patent Number: 5,986,420

[45] Date of Patent: Nov. 16, 1999

[54] APPARATUS FOR AUTOMATICALLY OPENING AND CLOSING POP-UP DOOR OF A VEHICLE

[75] Inventor: Kenji Kato, Kariya, Japan

[73] Assignee: Toyota Shatai Kabushiki Kaisha, Kariya, Japan

[21] Appl. No.: 08/941,071

[22] Filed: Sep. 30, 1997

[30] Foreign Application Priority Data

Nov. 11, 1996 [JP] Japan .................................... 8-315420

[51] Int. Cl.[6] ........................................................ B60J 5/10

[52] U.S. Cl. .............................. 318/272; 318/1; 318/461; 318/468; 49/32

[58] Field of Search ................................ 318/1, 256, 264, 318/265, 266, 280, 283, 286, 446, 461, 463, 272, 467, 468; 49/29, 30, 32, 139

[56] References Cited

U.S. PATENT DOCUMENTS 5,434,487 7/1995 Long et al. ............................. 318/286
5,525,880 6/1996 Geringer et al. ......................... 318/446
5,757,156 5/1998 Sasajima ................................. 318/456
5,804,937 9/1998 Sasajima et al. ........................ 318/259

*Primary Examiner*—Bentsu Ro
*Attorney, Agent, or Firm*—Pillsbury Madison & Sutro LLP

[57] ABSTRACT

One end of a toothed cable is connected to a rear door of a vehicle. The toothed cable moves forward and backward, thus opening and closing the rear door. A drive motor imparts a moving force to the toothed cable. An electromagnetic clutch connects the drive motor to the toothed cable and disconnects the drive motor from the toothed cable. A speed sensor detects the movement of the toothed cable when the electromagnetic clutch is set to a disconnected state. A control unit sets the electromagnetic clutch to a connected state when the movement of the toothed cable is detected and actuates the drive motor to allow the toothed cable to move in the same direction at that in which the toothed cable is moving. When the completely opened or closed rear door is moved to some extent in a closing direction or an opening direction by an operator's hands, the rear door is automatically closed or opened by the drive motor.

4 Claims, 5 Drawing Sheets

APPARATUS FOR AUTOMATICALLY OPENING AND CLOSING POP-UP DOOR OF A VEHICLE

CROSS-REFERENCE TO RELATED APPLICATION

This application is related to Japanese Patent Application No. Hei 8-315420, incorporated herein by reference.

BACKGROUND OF THE INVENTION

1. Field of the Invention

The present invention relates to an apparatus for automatically opening and closing a pop-up rear door of a van using a drive motor or the like.

2. Description of Related Art

In recent years, large-sized vans such as recreational vehicles have become very popular. Needless to say, the pop-up rear door of the body of such a large van is fairly large and heavy. Thus, short people have difficulty in opening and closing the rear door. In order to solve this problem, Japanese Laid-Open Utility Model Publication No. Hei 5-52165 discloses an automatic door-closing system including a drive motor provided inside the body to wind the wire thereon, one end of which is connected to the rear door. Further, in order to automatically open the rear door, this automatic door-closing apparatus has a coil spring to open the rear door at an angle larger than the angle at which the urging force of the damper installed on the rear part of the vehicle body starts to work in the door press-up direction.

However, although it can be automatically opened by utilizing the urging force of the damper, the above-described automatic door-closing apparatus is incapable controlling the opening speed of the rear door.

Further, in the conventional automatic door-closing apparatus, it is necessary to mount an operation switch for issuing an instruction signal for opening and closing the rear door to a drive motor on the vehicle body. It is convenient to install the operation switch on the rear door, which necessitates the operation switch-installing space to be secured in the rear part of the vehicle body and wires to be installed in the rear part thereof.

SUMMARY OF THE INVENTION

In view of the above problems of the prior art, it is an object of the present invention to provide an automatic opening and closing apparatus capable of controlling the door-opening speed and the door-closing speed without installing a door-opening/closing operation switch on the body of a vehicle.

In order to achieve the above object, a first aspect of the present invention provides an automatic opening and closing apparatus including an operation device, one end of which is connected to a pop-up door urged in an opening direction and which moves in a forward direction to open the door and a backward direction to close the door; a drive device provided at a side in which the other end of the operation device is positioned and which applies a moving force to the operation device; a clutch device connecting the drive device to the operation device and disconnecting the drive device from the operation device; a detection device detecting movement of the operation device when the clutch device is in a disconnected state; and a control device for setting the clutch device to a connected state when the movement of the operation device is detected and actuating the drive device to move the operation device in the same direction as that in which the operation device is moving. It is preferable to use a toothed cable as the operation device.

In this construction, upon pressing of the door with hands in the opening direction when the clutch device is in the disconnected state, the operation device moves in the forward direction. On the other hand, upon pressing of the door with the hands in the closing direction when the clutch device is in the disconnected state, the operation device moves in the backward direction. At this time, the detection device detects the movement of the operation device, and the clutch device is set to the connected state. In this state, the drive device is actuated so that the drive device moves the operation device in the same direction as that in which the operation device is moving. This construction allows the door to move automatically in the opening direction or the closing direction by moving the door to some extent in the opening direction or the closing direction with the hands. Because the opening and closing speeds of the door are determined by the movement speed of the operation device, the opening and closing speeds thereof can be controlled to be a desired and constant speed. Further, the detection device detects the movement of the operation device when the door is manually opened or closed, and then the drive device moves the operation device so that the door is automatically opened or closed automatically. Thus, it is unnecessary to install a door-opening/closing operation switch on the vehicle body, thereby eliminating the need for securing the door-opening/closing operation switch-installing space on the vehicle body and the labor of mounting wires on the vehicle body.

Unlike the case in which an ordinary wire is used to open and close the rear door, the use of the toothed cable as the operation device eliminates the need to provide a wiring pulley, thus allowing the construction of the automatic opening and closing apparatus to be simple.

Other objects and features of the present invention will appear in the course of the description thereof, which follows.

BRIEF DESCRIPTION OF THE DRAWINGS

Additional objects and advantages of the present invention will be more readily apparent from the following detailed description of preferred embodiments thereof when taken together with the accompanying drawings in which.

DETAILED DESCRIPTION OF THE PRESENTLY PREFERRED EXEMPLARY EMBODIMENTS

An automatic opening and closing apparatus of a pop-up door according to a preferred embodiment of the present invention will be described below with reference to the drawings.

Figure 1:
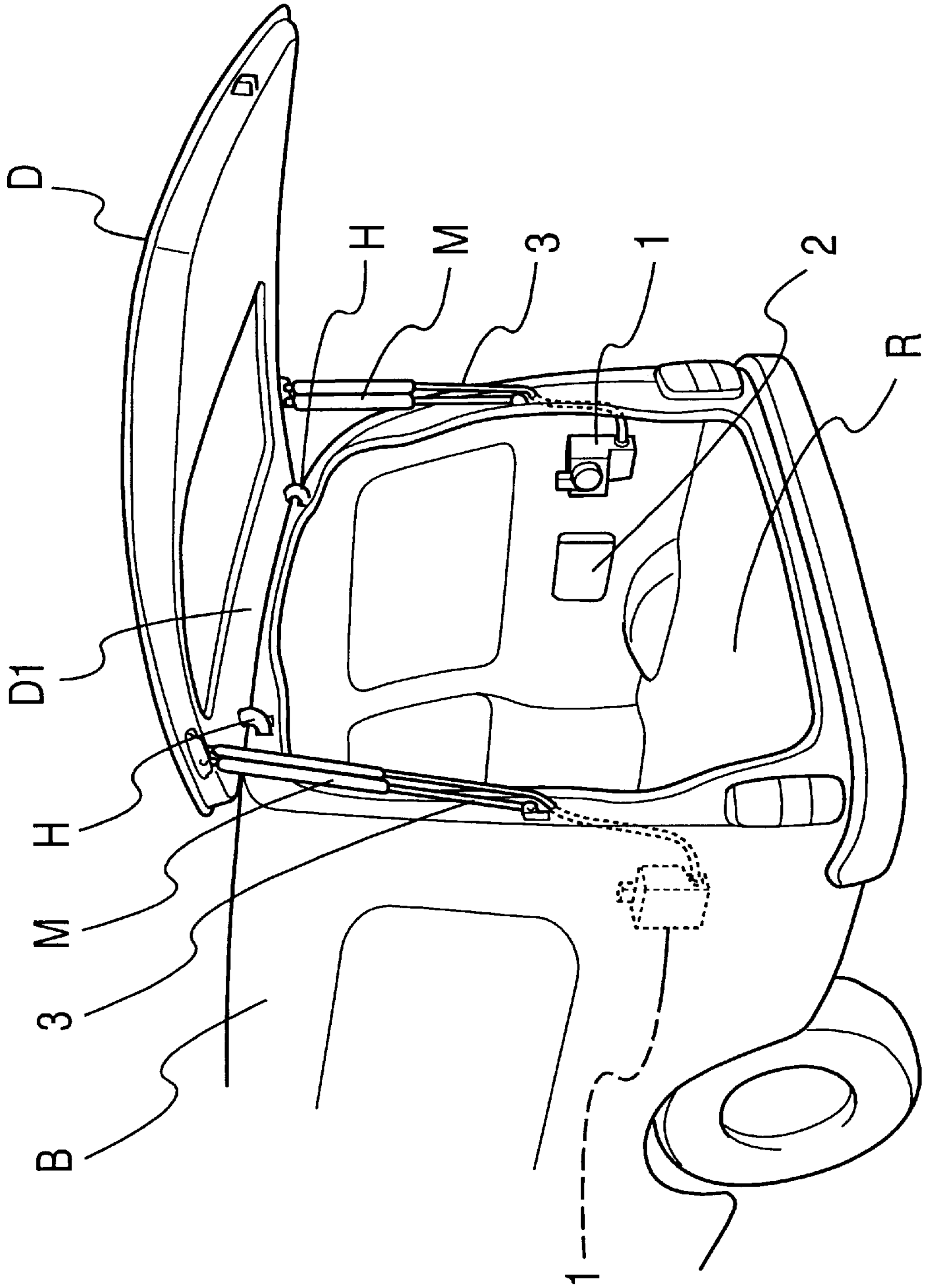
FIG. 1 is a perspective view showing a van having an automatic opening and closing apparatus for opening and closing a rear door which has been opened according to a preferred embodiment of the present invention.

FIG. 1 is a perspective view showing a popped-up rear door and a rear part of a van having the automatic opening and closing apparatus according to the embodiment. The upper edge (D1) of the pop-up rear door (D) is pivotally connected to the upper periphery of the rear opening on the rear part of the body (B) by a hinge mechanism (H) at the left-hand and right-hand sides of the rear upper part of the body (B). A pair of gas-filled dampers (M) are between the rear door (D) and the rear part of the body (B) to support the rear door (D) popped up by the extension force thereof. One end of the left-hand gas-filled damper (M) is mounted on the left-hand periphery of the upper part of the rear door (D) and the other end thereof is mounted on the left-hand periphery of the rear part of the body (B), whereas one end of the right-hand gas-filled damper (M) is mounted on the right-hand periphery of the upper part of the rear door (D) and the other end thereof is mounted on the right-hand periphery of the rear part of the body (B). A drive unit 1 which will be described later in detail is installed inside the body panel on each side of the interior (R) of the body (B) in the rear part of the body (B). A control unit 2, serving as the control means as recited in the appended claims, constituted by a microprocessor is inside one of the body panels. A toothed cable 3 (more specifically, an outer case thereof) serving as the operation means of the automatic opening and closing apparatus extends upward from each drive unit 1. The front end of each of the drive units 1 extends upward along each damper (M) and is connected to the rear door (D). The detailed construction of the toothed cable 3 is shown in FIG. 2.

Figure 2:
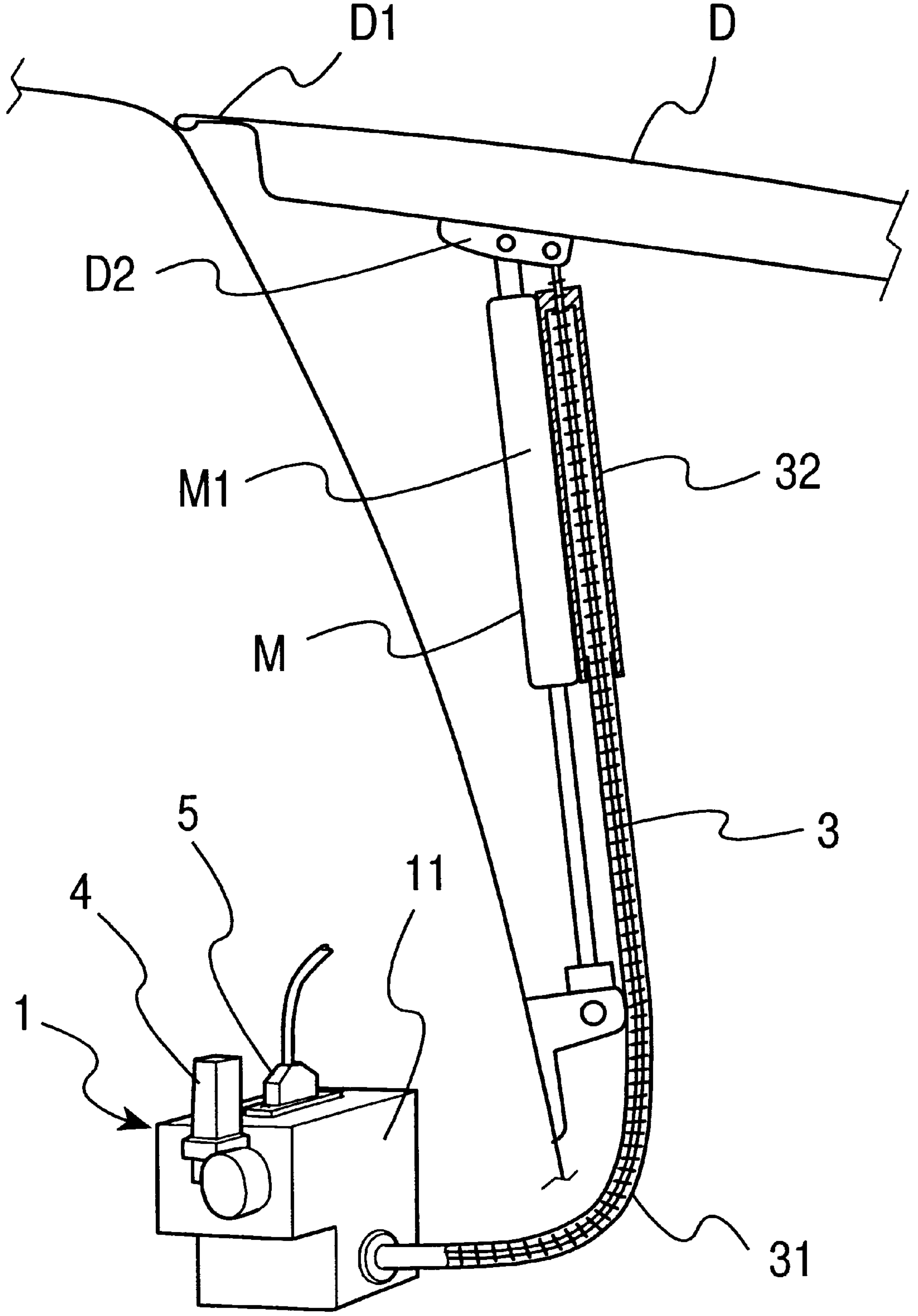
FIG. 2 is a semi-cross-sectional perspective view showing the automatic opening and closing apparatus according to the embodiment.

Referring to FIG. 2, the drive unit 1 has a stepped rectangular casing 11. With one end of the toothed cable 3 accommodated in the casing 11, the toothed cable 3 extends from a side surface of the casing 11 and is inserted through the cylindrical outer casing 31, thus extending upward along the length of the damper (M) and penetrating into an opening of a cylindrical upper end-closed sleeve 32 having a large diameter and attached to a side surface of a cylinder (M1) of the damper (M) The upper end of the toothed cable 3 extends through the sleeve 32 having a length equal to that of the cylinder (M1), and is pivotally connected to a bracket (D2) of the rear door (D). The upper end of the cylinder (M1) is also connected to the bracket (D2). A gear-provided drive motor 4 serving as the drive means of the automatic opening and closing apparatus is on the top surface of the casing 11 of the drive unit 1. A speed sensor 5 constituting the detection means of the automatic opening and closing apparatus is mounted on a surface of the casing 11.

Figure 3:
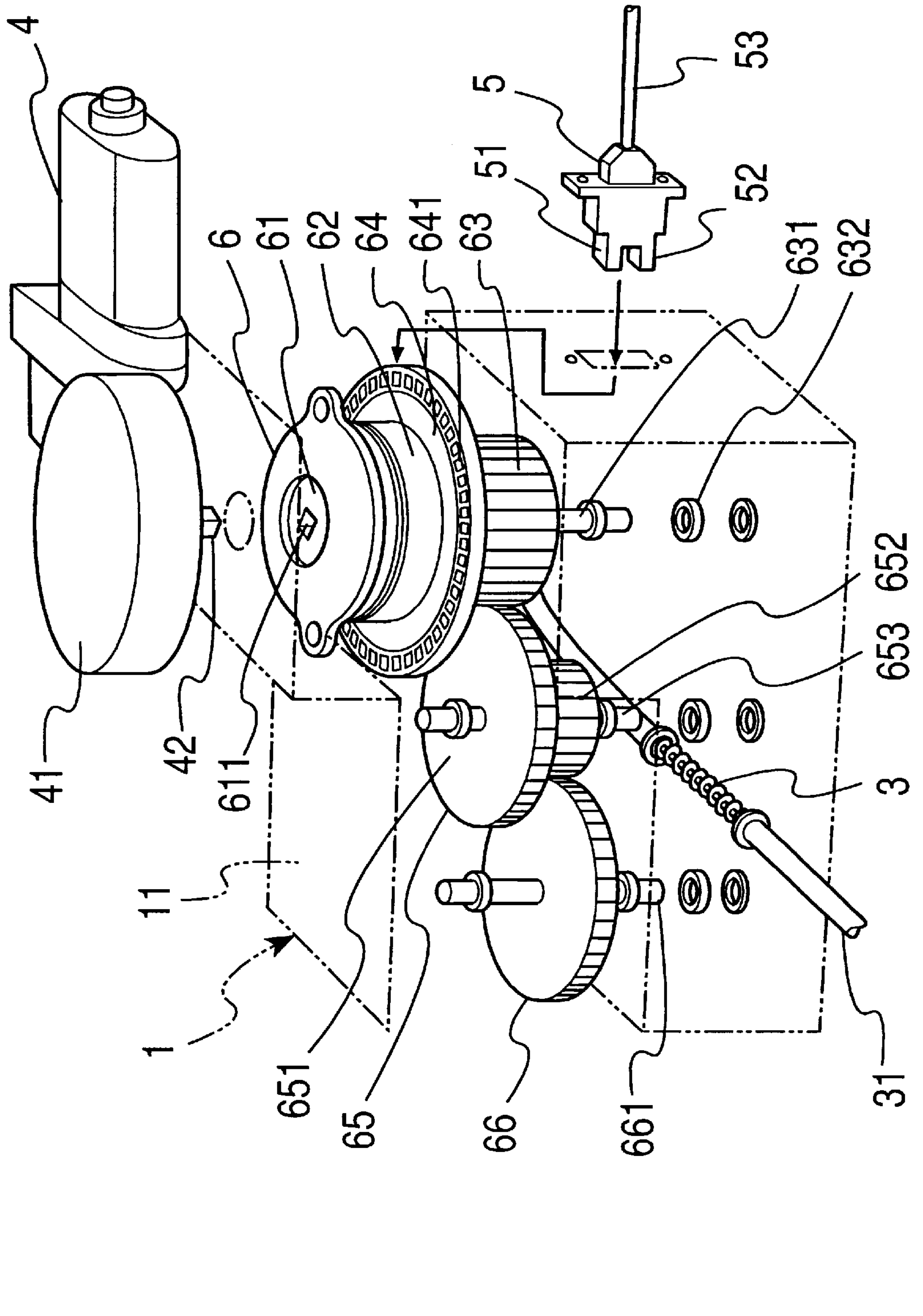
FIG. 3 is an exploded perspective view showing the internal construction of a drive unit according to the embodiment.

FIG. 3 is an exploded perspective view showing the internal construction of the drive unit 1. An output shaft 42 projects downward from the center of the lower surface of a reduction gear box 41 of the gear-provided drive motor 4 on the upper surface of the casing 11. The output shaft 42 penetrates through the upper surface of the casing 11, thus being fitted in a rectangular recess 611 on an end surface of an input shaft 61 of an electromagnetic clutch 6 positioned directly below the reduction gear box 41. The electromagnetic clutch 6 having a construction known in the art serves as the clutch means of the automatic opening and closing apparatus. When an internal coil (not shown) in the electromagnetic clutch 6 is energized, an output shaft 62 of the electromagnetic clutch 6 is connected to the input shaft 61 thereof, whereas when the internal coil is de-energized, the output shaft 62 is disconnected from the input shaft 61.

An output gear 63 and a sensor plate 64 having a large diameter are integral with the output shaft 62. The output gear 63 is rotatably mounted on a shaft 631. The shaft 631 stands erect inside the casing 11 via a bearing 632. The output gear 63 engages a drive gear 65 having a large-diameter portion 651 and a small-diameter portion 652. The large-diameter portion 651 engages the output gear 63. A guide gear 66 is adjacent to the small-diameter portion 652, with a slight gap provided therebetween. A part of the toothed cable 3 not accommodated in the outer casing 31 is interposed between the guide gear 66 and the small-diameter portion 652, thus engaging the guide gear 66 and the small-diameter portion 652.

The drive gear 65 and the guide gear 66 are respectively rotatably supported by shafts 653 and 661 standing erect inside the casing 11. Multiple holes 641 are formed at regular intervals in the periphery of the sensor plate 64. The vertically forked front ends 51 and 52 of the speed sensor 5 installed on the side surface of the casing 11 sandwich the periphery of the sensor plate 64 therebetween. The speed sensor 5 serves as the detection means of the automatic opening and closing apparatus. A light emitting diode is embedded in one front end 51 of the speed sensor 5, whereas a photo-transistor is embedded in the other front end 52. Each time a hole 641 is coincident with the front ends 51 and 52 while the sensor plate 64 is rotating, the speed sensor 5 outputs a pulse signal to the control unit 2 through a signal cable 53.

Figure 4:
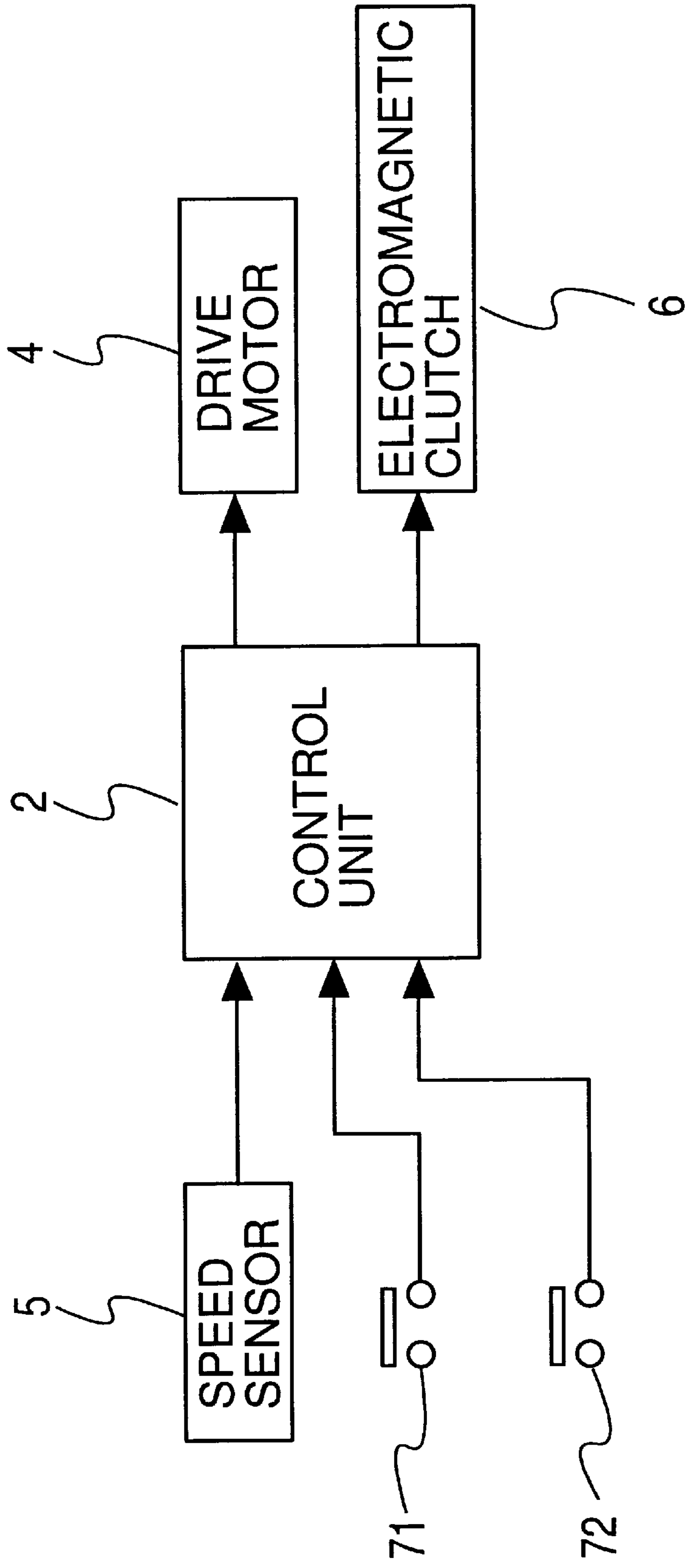
FIG. 4 is a block diagram showing the electrical construction of the automatic opening and closing apparatus according to the embodiment.

FIG. 4 is a block diagram showing the electrical construction of the automatic opening and closing apparatus. The input side of the control unit 2 is connected to the speed sensor 5, an opening end indication limit switch 71 which is actuated when the rear door (D) is opened completely, and a closing end indication limit switch 72 which is actuated when the rear door (D) is closed completely. The output side of the control unit 2 is connected to the drive motor 4 and the electromagnetic clutch 6. The automatic opening and closing apparatus is operated according to the procedure which is described below.

Figure 5:
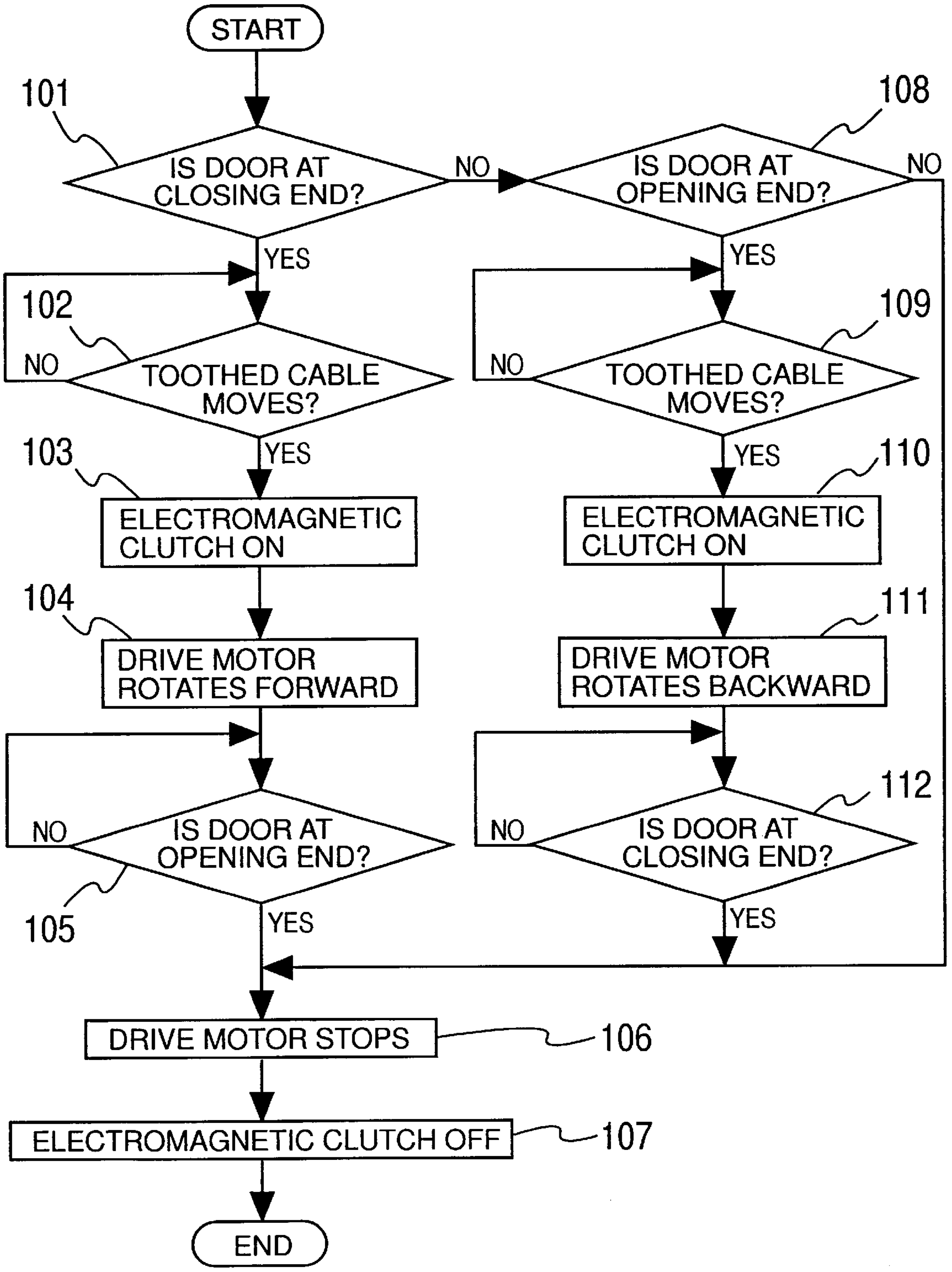
FIG. 5 is a flowchart showing the control procedure which is executed by the control unit.

With reference to FIG. 5 showing a flowchart of the control procedure which is executed by the control unit 2, the operation of the automatic opening and closing apparatus will be described below. In opening the rear door (D), the control unit 2 determines at step 101 whether the rear door (D) is positioned at the end in its closing direction upon receipt of a signal from the closing end indication limit switch 72. In this condition, the rear door (D) is unlocked and pulled upward by a user, namely, in the opening direction, and the toothed cable 3 is pulled upward from the casing 11. Consequently, the drive gear 65, the output gear 63, and the sensor plate 64 rotate. Each time a hole 641 is coincident with the front ends 51 and 52 of the speed sensor 5, the speed sensor 5 outputs a pulse signal to the control unit 2.

When the control unit 2 determines at step 102 that it has received the pulse signal, at step 103 the electromagnetic clutch 6 is energized to connect the input shaft 61 to the output shaft 62 to rotate the drive motor 4 forward at step 104. Through the electromagnetic clutch 6, the output gear 63 and the drive gear 65 are rotated in the same direction as that in which they are rotating, thus moving the toothed cable 3 forward. Consequently, the rear door (D) is swung to the completely open position at a constant speed according to the forward moving speed of the toothed cable 3, while the rear door (D) is receiving the urging force of the damper (M). When the control unit 2 determines at step 105 that the rear door (D) has completely opened, upon receipt of a signal from the opening end indication limit switch 71, the forward rotation of the drive motor 4 is stopped at step 106, and the electromagnetic clutch 6 is set to the disconnected state at step 107.

In closing the completely opened rear door (D), the control unit 2 determines at step 108 whether the rear door (D) is positioned at the end in the opening direction upon receipt of a signal from the opening end indication limit switch 71. In this condition, the rear door (D) is pressed downward by a user, namely, in the closing direction, and the toothed cable 3 is moved backward into the casing 11; thus, the drive gear 65 and the output gear 63 rotate in the direction opposite to that while opening the door. Thus, the sensor plate 64 rotates in the direction opposite to that while opening the door. Each time a hole 641 coincides with the front ends 51 and 52 of the speed sensor 5, the speed sensor 5 outputs a pulse signal to the control unit 2, as in the case of the door-opening time.

When the control unit 2 determines at step 109 that it has received the pulse signals, the electromagnetic clutch 6 is energized at step 110 and the drive motor 4 rotates backward at step 111. Via the electromagnetic clutch 6, the output gear 63 and the drive gear 65 keep rotating in the same direction as that in which they are rotating, thus moving the toothed cable 3 backward into the casing 11. Consequently, the rear door (D) is swung to the completely closed position at a constant speed according to the backward moving speed of the toothed cable 3 against the urging force of the damper (M). When the control unit 2 determines at step 112 that the rear door (D) has been completely closed, upon receipt of a signal from the closing end indication limit switch 72, the backward rotation of the drive motor 4 is stopped at step 106, and the electromagnetic clutch 6 is set to the disconnected state at step 107.

As described above, in the automatic opening and closing apparatus of the pop-up door of the embodiment, when the completely closed rear door (D) is pulled upward to some extent in the door-opening direction or when the completely opened rear door (D) is pressed downward to some extent in the door-closing direction, the drive motor 4 is driven, thus opening or closing the rear door (D) at a constant speed automatically. Accordingly, even a person having little strength can open or close the rear door (D) of a comparatively large van or the like easily. Further, because the drive motor 4 is driven by detecting the rear door-opening operation and the rear door-closing operation, it is unnecessary to provide the automatic opening and closing apparatus with an operation switch, which eliminates the need for securing the operation switch-installing on the vehicle body and the labor of mounting wires in the vehicle body.

In the embodiment, in order to determine the moving direction of the toothed cable 3, the control unit 2 determines whether the rear door (D) has been completely opened or closed upon receipt of a signal from the opening end indication limit switch 71 or the closing end indication limit switch 72, respectively; however, it is possible to provide the holes 641 on the sensor plate 64 in two rows by differentiating the phases thereof to determine the moving direction of the toothed cable 3, based on the rotation direction of the sensor plate 64. It is also possible to use a sensor structure different from the photo-electrical arrangement disclosed above. For example, an electromagnetic or electrical contact arrangement may be used.

Further although the present embodiment has been disclosed in connection with opening and closing end indication limit switches 71 and 72, those components are not essential to the operation of the invention. For example, instead of using the opening end indication limit switch 71, the control unit 2 may determine that the rear door (D) is fully opened when the speed sensor 5 does not generate a pulse for a predetermined amount of time, or for an amount of time based on the time between recent pulse signals, such a state indicating that the toothed cable 3 has stopped moving. A similar arrangement may be used for the closing end indication limit switch, or the fully closed state of the rear door (D) may be determined by sensing when the load on the drive motor 4 rises above a predetermined level. These variations have the added advantage of allowing the user to stop motion of the rear door (D) short of the fully opened or fully closed state, thereby permitting the door to be maintained in a partially opened position.

Still further, the toothed cable 3 and associated gear mechanism of the drive unit 1 need not be used, and another technique such as, e.g., a cable which frictionally engages components in the drive unit 1 to impart motion thereto, may be used.

Although the present invention has been fully described in connection with a preferred embodiment thereof with reference to the accompanying drawings, it is to be noted that various changes and modifications will be apparent to those skilled in the art. Such changes and modifications are to be understood as included within the scope of the present invention as defined by the appended claims.

What is claimed is:

1. An automatic opening and closing apparatus of a pop-up door comprising:

operation means, one end of which is connected to a pop-up door urged in an opening direction, for moving in a forward direction to open the door and a backward direction to close the door;

drive means, provided at an opposite end of the operation means from the pop-up door, for applying a moving force to the operation means;

clutch means for selectively connecting the drive means to the operation means and disconnecting the drive means from the operation means;

detection means for detecting a movement of the operation means when the clutch means is in a disconnected state; and control means for setting the clutch means to a connected state when movement of the operation means is detected and actuating the drive means to move the operation means in the same direction as that in which the operation means is moving, wherein the operation means comprises a toothed cable which engages a drive gear rotated by the drive means, thus receiving a moving force.

2. The apparatus of claim 1, wherein:

the clutch means comprises an electromagnetic clutch having an input shaft connected to an output shaft of a drive motor serving as the drive means and an output shaft connected to the drive gear; and the input shaft and the output shaft are connected to each other when a coil accommodated in the electromagnetic clutch is energized.

3. The apparatus of claim 2, wherein the detection means is for detecting a rotation of the output shaft of the electromagnetic clutch.

4. The apparatus of claim 3, the detection means comprising:

a sensor plate formed on a periphery of the output shaft of the electromagnetic clutch and having through-holes formed on a periphery thereof at regular intervals; and a sensor detecting passage of the through-holes.

* * * * *